United States Patent [19]

Foller

[11] 3,896,838

[45] July 29, 1975

[54] VALVE

[75] Inventor: Werner Foller, Heiligenrode, Germany

[73] Assignee: Gestra-KSB Vertriebsgesellschaft, Bremen, Germany

[22] Filed: Oct. 7, 1974

[21] Appl. No.: 512,596

[30] Foreign Application Priority Data
Oct. 15, 1973 Germany............................. 235176

[52] U.S. Cl. .................. 137/195; 137/415; 251/38; 251/44
[51] Int. Cl.² .......................................... F17T 1/20
[58] Field of Search ...... 137/195, 413, 415; 251/38, 251/44

[56] References Cited
UNITED STATES PATENTS

| | | | |
|---|---|---|---|
| 811,420 | 1/1906 | Marsh................................. | 137/195 |
| 3,114,532 | 12/1963 | Gray................................. | 251/38 X |

*Primary Examiner*—Alan Cohan
*Attorney, Agent, or Firm*—Allison C. Collard

[57] ABSTRACT

A float controllable valve responsive to a level of fluid having a housing with an internal chamber including an input supply opening and a discharge opening, a cylinder disposed over the discharge opening within the internal chamber of said housing, the cylinder having at least one radial input opening communicative to the housing chamber, and a valve seat communicative with the discharge opening, a control piston moveably disposed in said cylinder and having a first locking member in sealing contact with the valve seat, the piston and the locking member having a connecting channel formed therethrough, an auxiliary piston moveably disposed in said cylinder and adjacent to the control cylinder, and defining a first throttle opening between the auxiliary and the control pistons, and a second throttle opening between the auxiliary piston and the cylinder. A second locking member is coupled to the auxiliary piston and seals the connecting channel. A float is disposed within the housing chamber and coupled to the second locking member.

5 Claims, 3 Drawing Figures

VALVE

This invention relates to a valve having a large locking member that can be closed by a relatively small float. The float actuates a small auxiliary locking or sealing member so as to create a pressure reduction in the cylinder, so that the control piston actuates a large main locking or sealing member, due to the pressure difference at its two front surfaces. However, in conventional valves, the opening and sealing by the main locking or sealing member takes place very gradually. This causes the locking member to have partially open positions close to the sealing position which creates undue wear on the locking member as a result of fluid erosion.

It is therefore an object of the present invention to improve the valves of the prior art in providing a large, rapid opening and closing of the valve.

As long as both locking members of the inventive valve are in a closed position, the same full inlet pressure is applied to both front surfaces of the piston. Under these conditions, the control piston keeps the main locking member in a sealed position, since the inner surface of the piston is larger than the outer front surface which is reduced by the cross section of the valve seat. In contrast, the inlet pressure applied across the surfaces of the auxiliary piston are of equal magnitude. The auxiliary piston is in a relieved position when the auxiliary locking member is in a sealed position so that during this time no pressure forces are exerted by the auxiliary piston onto the auxiliary locking member.

When the float moves the auxiliary locking member from its sealed position due to an increase of the fluid level in the inlet pressure chamber of the valve, the pressure in the inner chamber of the cylinder decreases below the inlet pressure, since the connections between the inner cylinder chamber and inlet pressure chamber is made through a throttle space. The throttle space is relatively smaller than the connecting channel for the low pressure side. Thus, a force is created at the auxiliary piston in the valve opening direction which is additionally effective on the auxiliary sealing member. Therefore, the balance between the sealing force of the auxiliary locking member, and the opening force created by the float is eliminated, and the auxiliary locking member snaps rapidly into an open position, and rapidly opens the connecting channel to the low pressure side completely. In this way, a further sudden and strong pressure decrease is created in the cylinder chamber and via the control piston and onto the main locking member so that the control piston opens the main locking member very rapidly. Correspondingly, the sealing is accomplished in the reverse sequence.

Due to the arrangement of the auxiliary piston, the desired opening and closing characteristics are obtained.

Other objects and features of the present invention will become apparent from the following detailed description when taken in connection with the accompanying drawings which disclose several embodiments of the invention. It is to be understood that the drawings are designed for the purposes of illustration only, and are not intended as a definition of the limits and scope of the invention disclosed.

In the drawings, wherein similar reference numerals denote similar elements throughout the several views.

Figure 1:
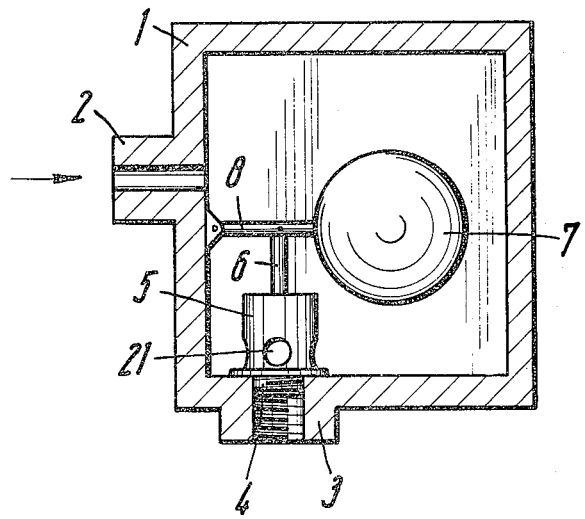
FIG. 1 shows in cross-section a float controlled steam trap.

In FIG. 1, a steam trap housing 1 is shown together with an inlet bushing 2 and an outlet bushing 3. A bell-shaped cylinder 5 is mounted within housing 1 on a valve seat element 4. An actuating rod 6 extends into the cylinder and is engaged by a float 7 to adjust the stroke. The float is mounted on a pivotable lever 8 which is mounted on housing 1.

Figure 2:
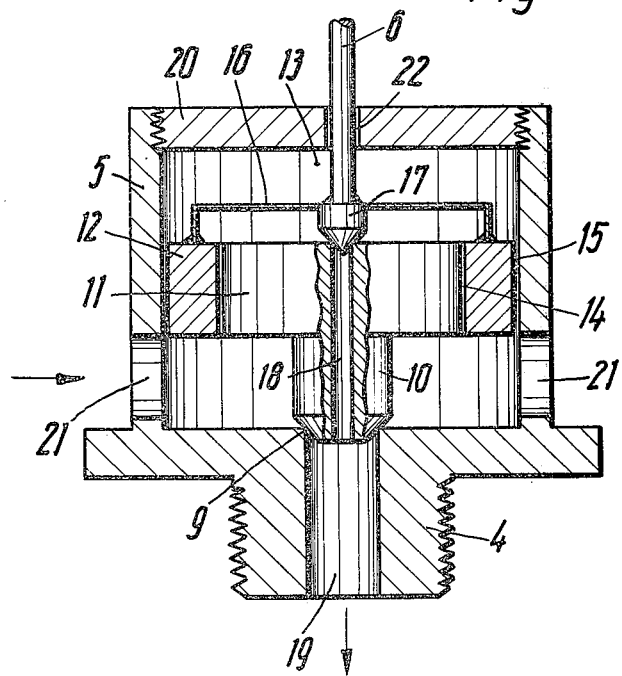
FIG. 2 shows the sealing members together with the piston of the steam trap, in accordance with FIG. 1.

FIG. 2 shows in an enlarged scale and in a cross-sectional view, the valve seat element 4, provided with a valve seat 9 which cooperates with a main sealing or locking member 10. Locking member 10 is connected to a control piston 11 at the opposite side from valve seat 9. Control piston 11 is concentrically surrounded by an annular piston 12. Each of both pistons has one front surface in inner cylinder chamber 13. Annular throttle spaces 14 and 15 are provided between the control piston 11 and auxiliary piston 12, and also between the auxiliary piston and the cylinder wall. Auxiliary piston 12 is connected to an auxiliary sealing or locking member 17 by means of a U-shaped yoke 16. The auxiliary member 17 controls a connecting channel 18 which axially runs through control piston 11 and the main sealing or locking member 10. This connecting channel connects the inner cylinder chamber 13 with low pressure side 19 of the steam trap. For actuating purposes, the auxiliary sealing member 17 is connected with float lever 8 across cylinder lid 20 by rod 6. Below pistons 11 and 12, cylinder 5 is provided with radial openings 21 for the medium to be discharged.

When both sealing members 10 and 17 are in a sealed position, pistons 11 and 12 are fed by the full inlet pressure in steam trap housing 1. Since the front surface (of piston 11) under pressure in the closing direction is larger than the front surface (of piston 11) under pressure in opening direction. The pressure exerts a sealing force on main sealing member 10 and keeps it in a sealed position. Both front surfaces of auxiliary piston 12 are of the same size, so that this piston with respect to its load, is in a state of equilibrium. Therefore no pressures are exerted by the auxiliary piston onto the auxiliary sealing member 17. The auxiliary sealing member and the free end of actuating rod 6 which extends beyond cylinder 5 are loaded with the full inlet pressure in the closing direction so that the forces required for opening are defined by the float. As soon as float 7 has a sufficient force due to the increasing level of the condensate in steam trap housing 1, it lifts the auxiliary sealing member very slightly. This establishes a connection between inner cylinder chamber 13 and low pressure side 19. Thus, the medium flows from inner cylinder chamber 13, through connecting channel 18, to low pressure side 19. The medium which flows in from the inlet pressure side into inner cylinder chamber 13 is subject to throttling in annular slots 14, 15 and 22, so that the pressure in inner chamber 13 decreases below the inlet pressure. Thus, a force in the opening direction is created on auxiliary piston 12 which exerts an additional opening force on auxiliary sealing member 17 aside from the force of float 7. The previous balance between the sealing force exerted by the medium pressure on auxiliary sealing member 17 and the opening force created by the float is cancelled and auxiliary member 17 rapidly opens. In other words, the cross section of connecting channel 18 toward the low pressure side is rapidly opened. Thus, a further sudden and very strong pressure decrease takes place in cylinder chamber 13 so that an opening force instead of a sealing force is created at control piston 11 which rapidly moves the main sealing member 10 into an open position. If less condensate is present at the trap than corresponds to the open position, the auxiliary sealing member 17 closes slightly in a conventional manner until due to the decreased flow, the pressure in the cylinder inner chamber 13 and on the adjacent front surface of the pistons 12 and 11 increase sharply, so that the sealing forces of the auxiliary sealing member 17 are restored. In this position, the auxiliary valve and also the main valve close in the same rapid manner.

Figure 3:
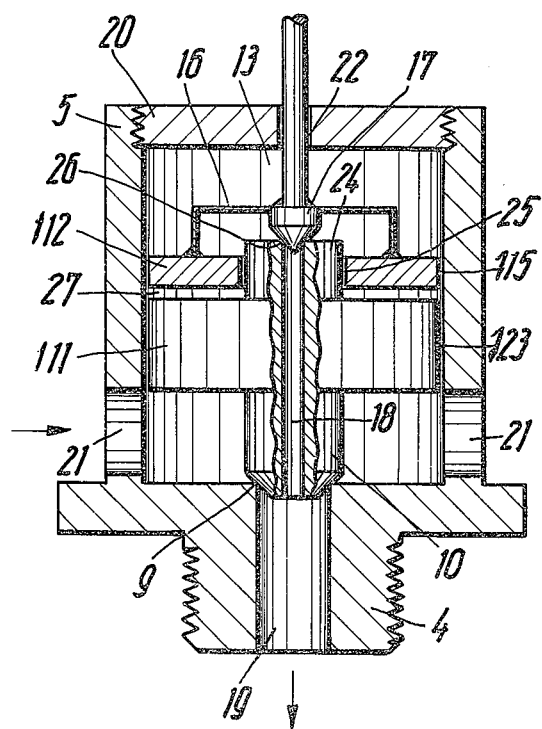
FIG. 3 shows another embodiment of the locking members and the piston.

The embodiment of FIG. 3 differs from FIG. 2 in that auxiliary piston 112 is in the shape of a disk which covers control piston 111 against cylinder inner chamber 13. In contrast to the previous embodiment, both pistons 111 and 112 are directly guided through cylinder 5 by annular throttle spaces 115 and 123. Furthermore, control piston 111 is provided with an axial bushing 24 which penetrates a central bore of auxiliary piston 112 by forming an annular throttle space 25. At its free end, the auxiliary bushing 24 is provided with a valve seat 26 for auxiliary sealing member 17. After auxiliary valve 17 opens and the medium flows through inlet opening 21 into inner chamber 13, the medium is subject to a first throttling in annular slots 123 and a further throttling in annular slots 115 and 25. In slot 27, between control piston 111 and auxiliary piston 112, an intermediate pressure is created between the full inlet pressure and the pressure in inner cylinder space 13. This pressure difference, as already explained with respect to the first embodiment, causes a rapid opening of auxiliary sealing member 17 with a subsequent rapid opening of main sealing member 10. Besides actuating the auxiliary sealing member by means of a float, it is also possible, within the scope of the invention to control the auxiliary sealing member by other suitable elastically yieldable actuating means in the stroke direction.

While only a few embodiments of the present invention have been shown and described, it will be obvious to those skilled in the art that many changes and modifications may be made thereunto without departing from the spirit and scope of the invention.

What is claimed is:

1. A float controllable valve responsive to a level of fluid comprising:
    a housing having an internal chamber including an input supply opening and a discharge opening;
    a cylinder disposed above the discharge opening within the internal chamber of said housing, said cylinder having at least one side open and communicative to the housing chamber;
    a control piston moveably disposed in said cylinder and having a main locking member in sealing contact with the discharge opening, said piston and locking member having a connecting channel formed therethrough and connecting the inner cylinder chamber with the low pressure side of the valve;
    an auxiliary piston moveably disposed in said cylinder and adjacent to said control piston, and defining a first annular throttle opening between said auxiliary and said control pistons and a second annular throttle opening between said auxiliary piston and said cylinder, said throttle openings connecting the cylinder chamber to the housing chamber;
    an auxiliary locking member disposed in said inner cylinder chamber and coupled to said auxiliary piston and sealing said connecting channel; and
    a float disposed within the housing chamber and coupled to said auxiliary locking member.

2. The valve according to claim 1 wherein said auxiliary piston comprises an annular body positioned between the circumferential surface of said control piston and the inner wall of said cylinder.

3. The valve according to claim 1 wherein said auxiliary piston comprises a disk having a central bore and covering said control piston with respect to the inner cylinder chamber, and including an annular throttle opening between the circumferential surface of said control piston and the inner wall of said cylinder.

4. The valve according to claim 3 wherein said control piston includes an axial bushing which penetrates the central bore of said disk by defining said first annular throttle opening between the bushing of the control piston and the central bore of the auxiliary piston, said axial bushing carrying a valve seat for said auxiliary locking member.

5. The valve according to claim 1 wherein said auxiliary piston and said auxiliary locking member are connected to each other by a yoke.

* * * * *